United States Patent [19]
Discepolo et al.

[11] Patent Number: 5,271,837
[45] Date of Patent: Dec. 21, 1993

[54] DRINKING WATER FILTRATION SYSTEM

[76] Inventors: Carl G. Discepolo, 1 Laurie Dr., Enfield, Conn. 06082; John H. Merrill, 31 Bank St., Lebanon, N.H. 03766

[21] Appl. No.: 871,970

[22] Filed: Apr. 22, 1992

[51] Int. Cl.[5] .................. B01D 24/08; B01D 27/08; B01D 35/30
[52] U.S. Cl. ................... 210/282; 210/283; 210/290; 210/450; 210/453
[58] Field of Search ............ 210/450, 453, 282, 903, 210/283, 290, 232, 435, 445

[56] References Cited

U.S. PATENT DOCUMENTS

| | | | |
|---|---|---|---|
| 1,917,121 | 7/1933 | Hughson | 210/282 |
| 2,525,497 | 10/1950 | Monfried | 210/290 |
| 3,250,397 | 5/1966 | Moltchan | 210/282 |
| 3,342,340 | 9/1967 | Shindell | 210/282 |
| 3,497,069 | 2/1970 | Lindenthal et al. | 210/283 |
| 3,529,726 | 9/1970 | Keenan | 210/282 |
| 4,098,691 | 7/1978 | Filby | 210/668 |
| 4,134,861 | 1/1979 | Roubinek | 210/683 |
| 4,182,676 | 1/1980 | Casolo | 210/669 |
| 4,341,636 | 7/1982 | Harder et al. | 210/662 |
| 4,352,735 | 10/1982 | Turetsky | 210/282 |
| 4,368,123 | 1/1983 | Stanley | 210/282 |
| 4,479,877 | 10/1984 | Guter | 210/903 |
| 4,789,472 | 12/1988 | Turetsky | 210/282 |
| 4,795,563 | 1/1989 | Auchincloss | 210/279 |
| 4,851,122 | 7/1989 | Stanley | 210/290 |
| 4,872,989 | 10/1989 | Pirotta | 210/903 |
| 4,904,383 | 2/1990 | Auerswald | 210/290 |
| 4,944,878 | 7/1990 | Lockridge et al. | 210/903 |

Primary Examiner—Stanley S. Silverman
Assistant Examiner—Cynthia L. Nessler
Attorney, Agent, or Firm—Michael J. Weins

[57] ABSTRACT

The present invention discloses a filter system for the filtration of residential tap water for drinking. The device of the present invention removes impurities including organics, heavy metals, and nitrates, and it provides a removable filter which can be readily changed without disconnecting the water lines. The filter in its simplest form has a central filter cartridge which is connected to a top cap and a bottom cap. The top cap and bottom cap have a water inlet and outlet, respectively. The central filter cartridge in turn has a conduit, which is terminated with restrainers, forming a central cavity in the central filter cartridge. The filter cartridge is filled with granular material for filtering. Particulate filters are positioned between the granular material and the restrainers. In one preferred embodiment the particulate matter forms a bed of a silver impregnated activated charcoal, a bed of a cation resin, and a bed of an anion resin. The activated charcoal is in closest proximity to the water inlet.

17 Claims, 3 Drawing Sheets

DRINKING WATER FILTRATION SYSTEM

FIELD OF INVENTION

The present invention relates to a water filtration system and more particularly to a system that is suitable for filtration of drinking water.

BACKGROUND OF THE INVENTION

The search for water filters to provide better quality drinking water has taken many paths. While many of these paths have improved certain aspects of the water quality to date, there remain many unsolved problems.

There have been a variety of canister type in-line water filter system with replaceable filters, such as those produced by Cuno Inc. and marketed under the trademark AQUA-PRO ®. While these in-line canisters allow one to replace the filter element, the spent filters have a residue deposited on the surface making handling at best distasteful and discouraging recycling of the filter which requires extensive handling.

The problem of surface residue has, in part, been overcome by disposable counter-top units, such as those produced by Herbalife International Inc. However, the difficulty with such units is that they require counter space which, in the kitchen environment, is at a premium. Furthermore, these counter top units are designed to be totally disposable and thus do not encourage recycling of the spent units. There are also other counter-top units, such as described in U.S. Pat. No. 4,717,476, which employ replaceable filters. However, these units require disconnecting and reconnecting of water lines when replacing the filter.

Some of the filters described in the filtration units discussed above employ silver impregnated activated charcoal to eliminate bacterial contamination. These filters reduce the bacterial contamination in drinking water, however they place residual silver in the water and silver is a contaminant.

Thus, there is a need for a filtration system that provides an in-line system, of which the filter can be conveniently removed, and encourages recycling of the filter unit. In addition, there is a need for a system where the silver can be readily employed to remove bacterial contaminants, without residual silver being left in the water.

SUMMARY OF THE INVENTION

It is an object of the invention to provide a drinking water filtration system with a filter element which can be readily changed.

It is another object of the invention to provide a drinking water filtration system that will encourage recycling of its filter element.

It is still a further object of the invention to provide a filtration system that introduces potassium to the water.

It is another object of the invention to provide a water filtration system which can be mounted under a counter.

Yet another object of the invention is to provide a water filtration system with a small footprint.

It is still another object of the invention to provide a water filtration system that provides continuous flow.

It is still a further object of the invention to provide a water filtration system which provides buffered water.

It is yet another object of the invention to provide a water filtration system which employs silver as a bactericidal agent.

Another related object of the invention is to provide a water filtration system that uses silver to eliminate bacterial contamination and subsequently removes the residual silver from the water.

It is still another object of the invention to provide anion and cation resin beds which are bacteriostatic.

The present invention provides a water filtration system which, in its simplest form, has a central filter cartridge, a top cap, and a bottom cap. The top has a water inlet cap, and the bottom has a water outlet cap. When the water filtration system is installed in a water line, the inlet and outlet are preferably connected with flexible tubing.

The central filter cartridge, in turn, in its simplest form, has a conduit having a top end and a bottom end. This conduit forms a side wall of the cartridge and has a top side rim terminating at a top end of the cartridge, and a bottom side rim terminating at a bottom end of the cartridge. A top restrainer, having passages therethrough, engages the top end of the conduit; while a bottom restrainer, having passages therethrough, engages the bottom end of the conduit. The conduit with its top restrainer and bottom restrainer engaged, defines a central cavity which holds a water filtration medium.

It is further preferred that the central cavity be fitted with a first particulate filter adjacent to the top restrainer and a second particulate filter adjacent to the bottom restrainer.

Means for securing and sealing the top and bottom cap to the central filter cartridge are provided.

In one preferred embodiment, a seal is maintained by providing a top cap recess in the top cap which is contoured to engage the top side rim of the conduit. Similarly, a bottom cap recess is provided in the bottom cap which is contoured to engage the bottom side rim of the conduit. In this embodiment, it is preferred that the top cap recess slidably engage the top side rim of the conduit and the bottom cap recess slidably engage the bottom side rim of the conduit. The sliding contact provides a seal between the conduit and the caps. It is further preferred that O-rings be employed to assure a seal between the conduit and the top and bottom caps. For this embodiment, the top cap and bottom cap can be secured to the central filter cartridge by tie rods that span the central filter cartridge and attach to the top and bottom caps. It should be appreciated that other securing means, such as bayonet couples, could be used.

It is further preferred that the restrainers have two sections. A plate, having a first side and a second side, forms the first section. The plate has apertures which form passages therethrough. A restrainer rim forms the second section and is attached to the plate. Alternatively, the plate and the rim can be an integral unit. Preferably, the restrainers have cavities bounded by their rims and first sides of their respective plates.

The restrainers, having cavities therein, are engaged with and preferably bonded to the conduit such that the restrainer cavities directly communicate with the water inlet, providing a water receiving cavity, and the water outlet, providing a water exiting cavity.

It is further preferred that the second sides of the restrainer plates have attached thereto the particulate filters. The particulate filters may be composed of bonded particles or alternatively, bonded or woven fibers. In all cases the material should have an interconnected network of pores or voids which will mechanically entrap solid contaminants.

It is still further preferred that a third particulate filter be employed and that this filter be placed in the water receiving cavity. This filter is positioned adjacent to the first side of the top plate and frictionally engages the top restrainer rim.

In one preferred embodiment, the central cavity contains a three stage filter. Each of the stages are particulate in nature. The first stage is composed of a bed of silver impregnated activated charcoal. This bed is in closest proximity to the top end of the conduit. The second and third stages are composed of a bed of cation exchange resin and a bed of anion exchange resin, respectively.

These percentages are maintained so that the filtration beds saturate at approximately the same time for most household water supplies. The cation resin should be composed of beads of microporous materials which have cations that will exchange with the heavy metals.

It is further preferred that the cation resin bed be a blend of a strong acid cation exchange resin, which is a cation resin having sulfonic groups as the principal functioning groups of the resin; and a weak acid cation exchange resin, which is a cation resin having carboxylic groups as the principal functioning groups of the resin. It is further preferred that the cation resins contain potassium as the replacement ion.

The anion resin is composed of beads of macroporous material having Cl— or OH— ions which exchange anions such as sulfates, nitrates and others.

Preferably, the volume percentages of the beds for a general purpose filter are approximately as follows:

| activated charcoal | 65% ± 10% |
| cation resin | 25% ± 10% |
| anion resin | 10% ± 5% | with the variation being such that the sum is 100%.

When the water contains high nitrates/nitrites or when preferential filtration for nitrates/nitrites is desired, then the filter distribution should be approximately:

| activated charcoal | 25% ± 10% |
| cation resin | 10% + 10% |
| anion resin | 65% ± 10% | with the sum being 100%.

It is still further preferred that a first screen be interposed between the silver impregnated activated charcoal and the resin beds, and that a second screen be positioned between the two resin beds.

BEST MODE OF CARRYING THE INVENTION INTO PRACTICE

Figure 1:
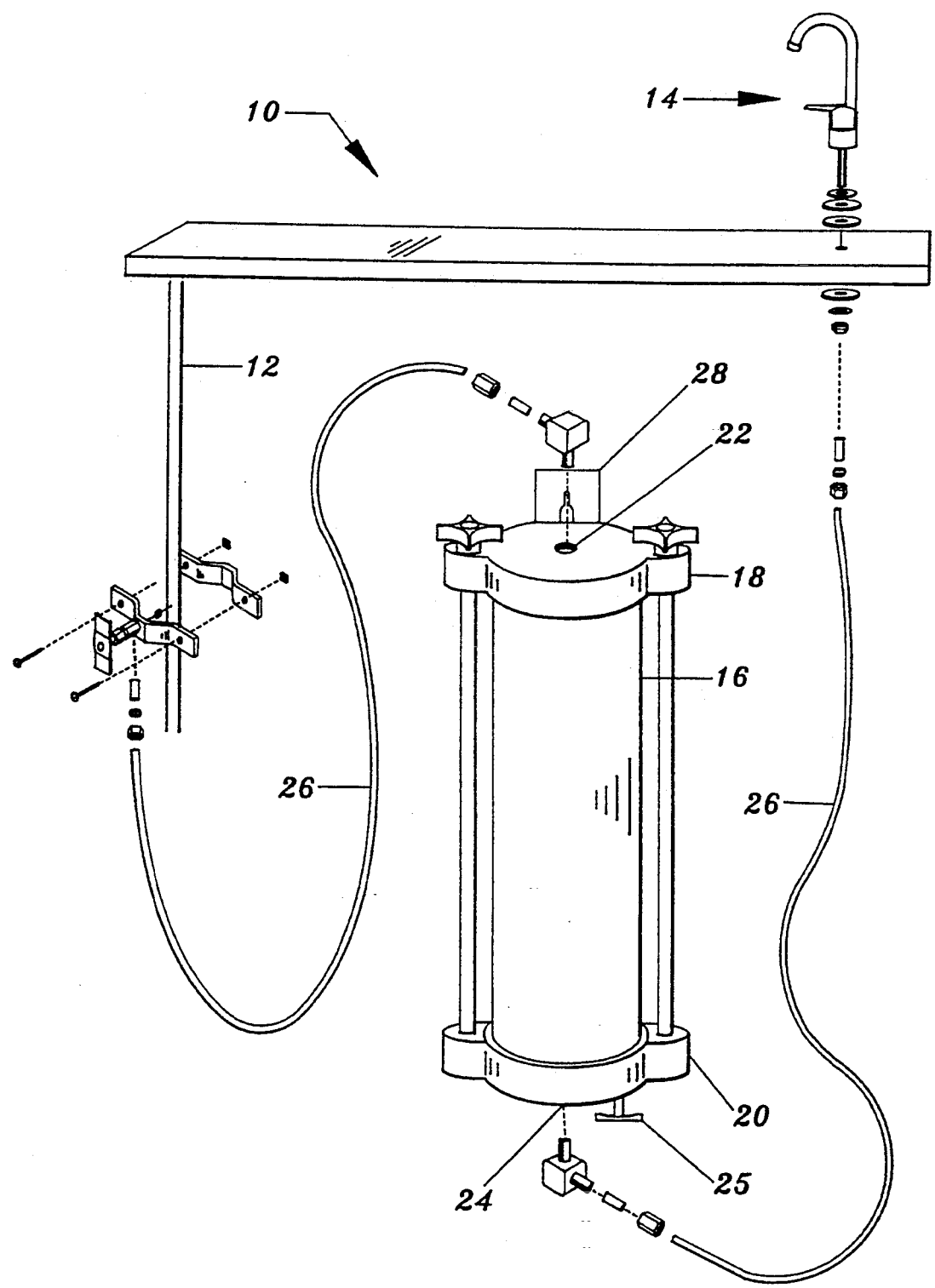
FIG. 1 illustrates one embodiment of the water filtration system of the present invention, showing the drinking water filtration system installed.

FIG. 1 shows a water filtration system 10, connected to a water supply line 12, and to a water faucet assembly 14. The water filtration system 10 has a central filter cartridge 16, which engages a top cap 18, and a bottom cap 20. Top cap 18 has a water inlet 22, while the bottom cap 20 has a water outlet 24. It is preferred when the water filtration system 10 is installed, that the water inlet 22 be connected to the water supply line 12; and that water inlet 22 be at the top of the water filter system 10. This provides for more effective filtration by maintaining bed integrity. However, it should be appreciated that the filter system will function in other inclinations.

The water inlet 22 is connected to the water supply line 12, with tubing 26. In a similar manner, tubing 26 is used to connect the bottom water outlet 24 to the water faucet assembly 14. A drain valve 25 is provided to allow draining of the filtration system 10 before the filter cartridge 24 is removed. The water filtration system 10 is supported by a frame 28 which is attached to suitable support such as a wall of a cabinet. It is preferred that the tubing 26 be made of a flexible material such as polyethylene which can be readily flexed and twisted. Employing such tubing facilitates removal of the frame 28 and changing of the central filter cartridge 16 without disconnecting the water-lines.

Figure 2:
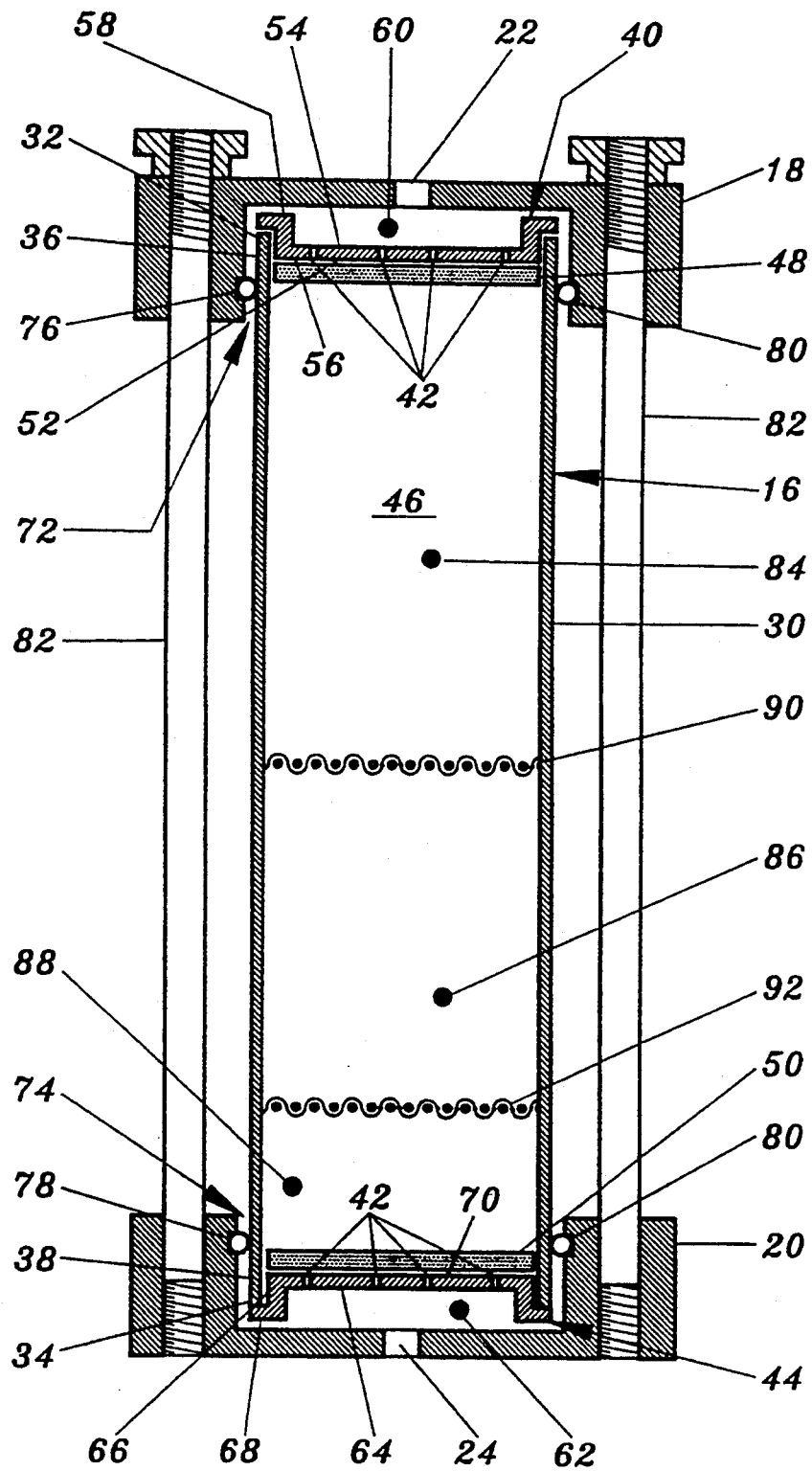
FIG. 2 shows a cross-section central filter cartridge and the top and bottom end caps of one embodiment of the present invention. In this embodiment, the caps are held in position with tie rods and the filter system provides for a multi bed filtering of water. Two particulate filters are employed.

FIG. 2 provides a view of a cross-section of the filtration system 10 of FIG. 1. The central filter cartridge 16 is provided with a conduit 30 having a top end 32 and a bottom end 34. The conduit 30 provides a sidewall of the central filter cartridge 16. The conduit 30 is preferably a material with a reactively relatively low Young's Modulus, such as a plastic like PVC, while the top cap 18 and the bottom cap 20 are a material with a higher Young's Modulus, such as a metal like aluminum.

The conduit 30 has a top side rim 36, which terminates at the top end 32, as well as a bottom side rim 38, which terminates at the bottom end 34. A top restrainer 40, having passages 42 therethrough, and a bottom restrainer 44, having passages 42 therethrough, engage the top end 32 and the bottom end 34, respectively. With the top restrainer 40 engaged with the top end 32 of the conduit 30 and the bottom restrainer 44 engaged with the bottom end 34 of the conduit 30, a central cavity 46 is formed.

The central cavity 46 is designed to hold a filtration medium used for filtrating the water. When the filter medium is composed of one or more beds of granulated material, it is preferred that the central cavity 46 be fitted with a first particulate filter 48, which is positioned adjacent to the top restrainer 40, and a second particulate filter 50, which is positioned adjacent to the bottom restrainer 44. The particulate filter may be composed of bonded particles or, alternatively, bonded or woven fibers. In all cases, the material should have an interconnected network of pores or voids which will mechanically entrap solid contaminants.

It is further preferred that the top restrainer 40 have two sections. The first section is a top retainer plate 52 having first side 54 and a second side 56. The top restrainer plate 52 has series of apertures therethrough forming the passages 42. Attached to the top restrainer plate 52 is a top restrainer rim 58 forming the second section of the top restrainer 40. Alternatively, the top restraining rim 58 can be made as an integral part of the top restrainer plate 52. In the embodiment of FIG. 2, the top restrainer rim 58 and the top restrainer plate 52 form a water receiving cavity 60 in the top restrainer 40. The water receiving cavity 60 is bound by the first side 54 of the top restraining plate 52 and by the top restraining rim 58. When the top restrainer 40 is positioned in the conduit 30, the water receiving cavity 60 communicates directly with the water inlet 22.

Similarly, the bottom restrainer 44 has a water exiting cavity 62, bounded by a first side 64 of a bottom restraining plate 66, and a bottom restraining rim 68. The water exiting cavity 62 communicates directly with the bottom water outlet 24.

When the filter medium has one or more beds of fine granulated material, the granulated material of the filter medium must be confined in the central cavity 46 to prevent the filter material from passing into the water supply line 12 and through subsequent fixtures such as the water faucet assembly 14 (both shown in FIG. 1). In addition to the disconcerting effect of providing granulated material in the water, the granulated material can hinder the operation of the fixtures to which they are attached. The seals for a faucet assembly 14 will be damaged by the granulated material, or, if the filtration system is attached to another device, such as an ice maker, the granulated material can damage the mechanism of the device. To avoid such problems, it is further preferred that the bottom restrainer rim 68 be bonded to the conduit 30 with a continuous bead of adhesive, providing a leak free interface therebetween. Similarly, it is preferred that the top restrainer rim 58 be sealed to the conduit 30 to avoid the granulated material from backflushing into the water supply line.

It is further preferred that the first particulate filter 48 be attached to the second side 56 of the first top restraining plate 52 with a bead of adhesive around the peripheral edge of the top restraining plate 52.

The second particulate filter 50 is similarly attached to a second side 70 of the bottom restraining plate 66 of the bottom restrainer 44.

Means for engaging and sealing the top cap 18 and the bottom cap 20 with the central filter cartridge 16 are shown in FIG. 2. This means for engaging and sealing employs a top cap recess 72 and a bottom cap recess 74 as part of the means. The top cap recess 72 engages the top side rim 36 and a seal therebetween is provided by a top O-ring 76. Similarly, the bottom cap recess 74 engages the bottom side rim 38 and a seal therebetween is provided by a bottom O-ring 78. Preferably, the O-rings 76 and 78 are held in channels 80 so that they remain positioned over the central cavity 46 when the top cap 18 and the bottom cap 20 are slid onto the conduit 30. The O-rings are preferably located around the central cavity 48 of the central filter cartridge 16. Tie rods 82 are provided, which span the central cartridge 16 and fasten the top cap 18 to the bottom cap 20. It is further preferred that the conduit be circular in cross section and that the material be a plastic such as PVC while the caps are metal. These materials will provide a differential in the Young's Modulus if the pressure in the liquid contained in the central cavity 48 is increased. The seal between the conduit 30 and the O-rings 78 will be maintained.

In the preferred embodiment shown in FIG. 2, the central cavity contains a three stage filter. The first stage is a bed of activated charcoal impregnated with silver 84. The silver activated charcoal is a granular mixture of activated charcoal with silver. Preferably the particle size range is principally between 20 and 50 microns. This bed is separated from a second bed of a cation resin 86. The cation exchange resins are formed from beads of macroporous materials which have cations that will exchange with the heavy metals. These ions are generally Na+, H+, NaH+ or K+. The bead size, preferably defined in terms of mesh size, is +16<7%, −50<1% expressed in mesh size.

It is further preferred that the cation exchange resin bed be a blended bed having a mixture of strong acid cation exchange resin and weak acid cation exchange resin. The strong acid cation exchange resin will exchange for heavy metals and other ions and radicals, and the weak acid cation exchange resin reduces the acidity of the water.

The third bed is an anion resin 88. The preferred bead size in terms of mesh size is +1200<5%, −300<15%.

Since the beds are granular in nature, they will tend to mix as the water flows through. To minimize the mixing, it is preferred that the first bed 84 and second bed 86 are separated by a first screen 90. The screen mesh size is chosen to be compatible with the particle size distribution of the material it separates. Similarly, a second screen 92 separates the second bed 86 and the third bed 88.

Figure 3:
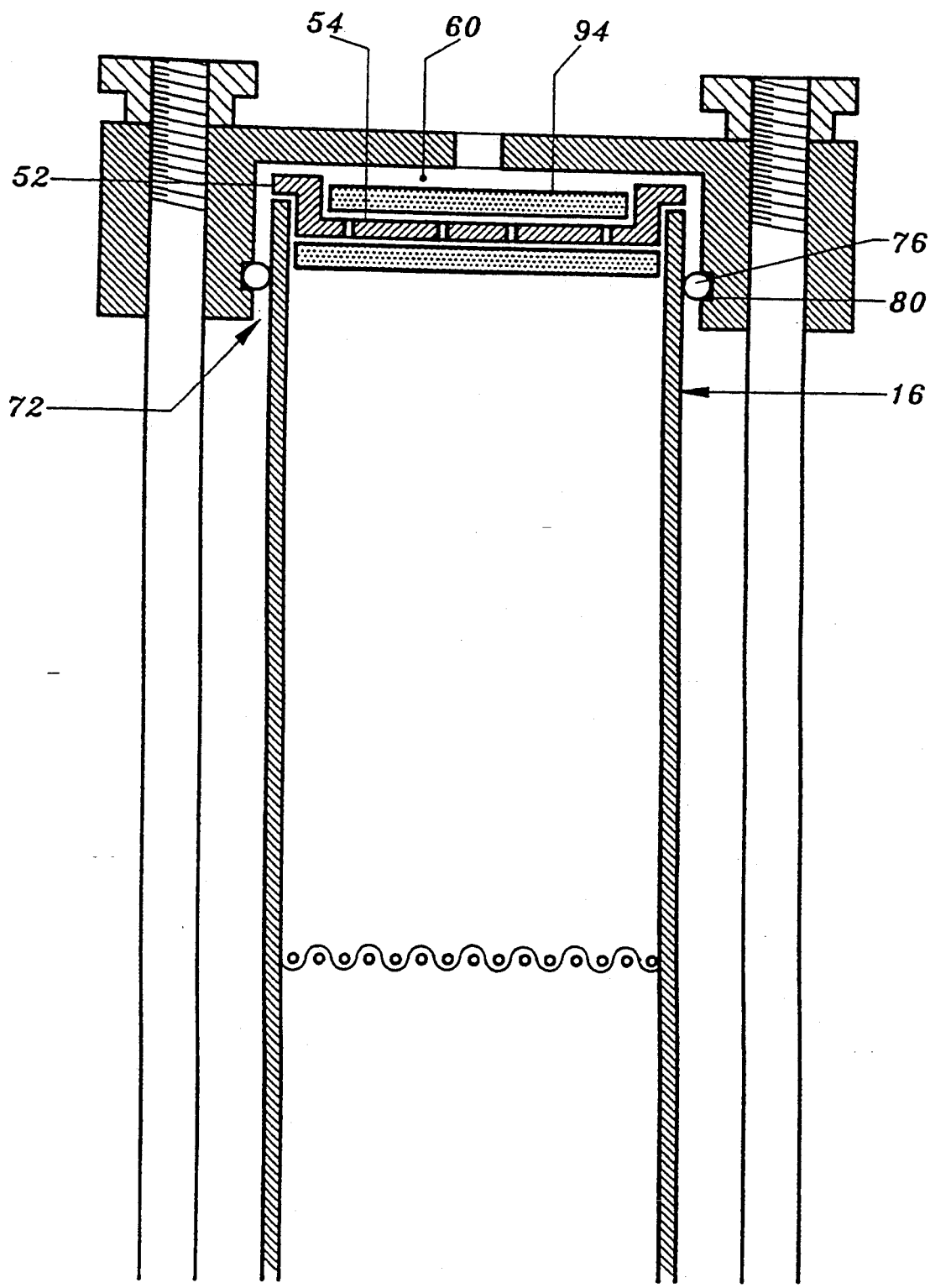
FIG. 3 is another embodiment which employs the two particulate filters of the embodiment shown in FIG. 2 as well as a third particulate filter.

FIG. 3 shows a central filter cartridge 16 which employs a third particulate filter 94. This filter is placed adjacent to the first side 54 of the top restrainer plate 52 and is situated in the water inlet cavity 60 when the central filter cartridge 16 is engaged with the top cap recess 72 in the water inlet cavity 60, and collects particulate material so as to avoid clogging of the filter. This filter is replaceable, and can be done so periodically.

In order to provide the reader with a better appreciation the following example of the details of the construction is given.

EXAMPLE

A filtration system, as shown in FIG. 2, was constructed using a four (4) inch in diameter and sixteen (16) inch in length PVC tube as the conduit. The conduit engages a recess in an aluminum top cap and a recess in an aluminum bottom cap. A water inlet is provided to the top cap and a water outlet is provided to the bottom cap. O-rings provide seals between the caps and the conduit.

PVC restrainers, having cavities therein, were employed to block the ends of the conduit, thereby creating a central cavity, approximately fifteen (15) inches long, for holding the filter medium. The central cavity was filled with three beds of granular filter media. Porous filters were attached to the restrainers so as to provide barriers between the filter beds and the restrainers. The porous filters were commercially available filters made by Porex Technologies, Corp. and marketed under the name Porex. Before the filters were placed in service, the restrainer rims were bonded to the conduit, and a porous filter element was placed in the cavity which communicates with the water inlet.

The first bed was silver impregnated activate charcoal. The bed depth was approximately 10 inches, and the bed was made up of 99.2% activated carbon with silver as the balance. The silver impregnated activated charcoal is marketed under the trademark HYGIENE MARK III.

A cation resin mix formed the second layer. It was a mixture of a weak acid resin, marketed under the mark AMBERLITE DP-I, and a strong acid resin mix, offered by Rohm & Haas Company. The bed depth was about 3½ inches.

For the third bed a nitrate selective anion exchange resin, offered by The Purolite Company, was selected. The bed depth was about 1½ inches.

Plastic screens were used to separate the beds. In both cases the screens used were 60 mesh plastic screens.

The caps were held in position with steel tie rods.

While the present invention has been described in view of preferred embodiments and particular applications, it should be appreciated by those skilled in the art that other embodiments, not specifically mentioned, could be made by those skilled in the art without departing from the spirit of the invention.

What we claim is:

1. A drinking water filtration system comprising:
   a top cap having a water inlet and a top cap recess contained therein;
   a bottom cap having a water outlet and a bottom cap recess contained therein;
   a central filter cartridge further comprising,
   a conduit having a top side rim forming a top end of said conduit and a bottom side rim forming a bottom end of said conduit,
   said top side rim being configured to slidably engage said top cap recess and said bottom side rim being configured to slidably engage said bottom cap recess;
   a top restrainer having passages therethrough engaging said top end and terminating said top end of said conduit;
   a bottom restrainer having passages therethrough engaging said bottom end and terminating said bottom end of said conduit;
   a water filtration medium;
   said conduit, said top restrainer, and said bottom restrainer defining a central cavity for holding said water filtration medium;
   tie rods spanning said central filter cartridge coupling said top cap to said bottom cap;
   a first sealing means between said top cap recess and said top side rim; and
   a second sealing means between said bottom cap recess and said bottom side rim.

2. The drinking water filtration system of claim 1 wherein said first sealing means and said second sealing means are O-rings, and said O-rings residing in said top cap recess between said top side rim and said top cap recess, and said bottom cap recess between said bottom side rim and said bottom cap recess.

3. The drinking water filter of claim 2 further comprising:
   channels in said top cap recess and said bottom cap recess,
   said channels being so positioned that said O-rings are located around the central cavity of said conduit.

4. The drinking water filtration system of claim 3 wherein said top cap and said bottom cap are metal and further wherein said conduit of said central filter cartridge is plastic.

5. The drinking water filtration system of claim 2, wherein said filtration medium comprises:
   a first particulate filter positioned in said central cavity adjacent to said top restrainer; and
   a second particulate filter positioned in said cavity adjacent to said bottom restrainer.

6. The drinking water filtration system of claim 5 wherein said first particulate filter is attached to said top plate of said top restrainer with a bead of adhesive around the peripheral edge of said top plate, and said second particulate filter is attached to said bottom plate of said bottom restrainer with a bead of adhesive around the peripheral edge of said bottom plate.

7. The drinking water filter of claim 6 further comprising:
   channels in said top cap recess and said bottom cap recess,
   said channels being so positioned that said O-rings are located around the central cavity of said conduit.

8. The drinking water filtration system of claim 7 wherein said top cap and said bottom cap are metal and further wherein said conduit of said central filter cartridge is plastic.

9. The drinking water filtration system of claim 5 wherein said top restrainer further comprises:
   a top plate having apertures;
   a first restrainer rim attached to said top plate forming a water receiving cavity, said water receiving cavity directly communicating with said inlet of said top cap; and
   further wherein said bottom restrainer further comprises:
   a bottom plate having apertures; and
   a second restrainer rim attached to said bottom plate forming a water exiting cavity, said water exiting cavity directly communicating with said outlet of said bottom cap.

10. The drinking water device of claim 9 wherein said first particulate filter is attached to said top plate of said top restrainer with a bead of adhesive around the peripheral edge of said top plate, and said second particulate filter is attached to said bottom plate of said bottom restrainer with a bead of adhesive around the peripheral edge of said bottom plate and further wherein said first restrainer rim and said second restrainer rim are bonded to said conduit by a continuous bead of adhesive.

11. The drinking water filter of claim 10 further comprising:
    channels in said top cap recess and said bottom cap recess,
    said channels being so positioned that said O-rings are located around the central cavity of said conduit.

12. The drinking water filtration system of claim 11 wherein said top cap and said bottom cap are metal and further wherein said conduit of said central filter cartridge is plastic.

13. The drinking water filtration system of claim 9 further comprising:
    a third particulate filter placed in said cavity in said top restrainer;
    a drain valve in said bottom cap communicating with said water exiting cavity.

14. The drinking water filtration system of claim 13 wherein said central cavity has a first bed, a second bed and a third bed, said beds being further defined as comprising:
    a bed of silver activated charcoal being in closest proximity to said top plate;
    a bed of cation exchange resin;
    a bed of anion exchange resin, wherein said cation layer is a blend of cation resins having a weak acid and a strong acid component; and wherein the drinking water filtration system further comprising:

a first screen between said first bed and said second bed; and a second screen between said second bed and said third bed.

15. The drinking water filtration system of claim 14 wherein the volume ratio of the filter beds are about:

| | |
|---|---|
| silver impregnated activated charcoal | 65% |
| cation resin | 25% |
| anion resin | 10% |

16. The drinking water filtration system of claim 14 wherein said anion resin is a nitrate selective anion exchange resin.

17. The drinking water filtration system of claim 16 wherein said anion resin is a nitrate selective anion exchange resin and the volume ratio of the filter beds are by volume about;

| | |
|---|---|
| silver impregnated activated charcoal | 25% |
| cation resin | 10% |
| anion resin | 65% |

* * * * *